INVENTORS
WOLDIMAR SOBOL
HORATIO LESLIE HIGGINS
BY
Ralph W. McIntire, Jr.
ATTORNEY

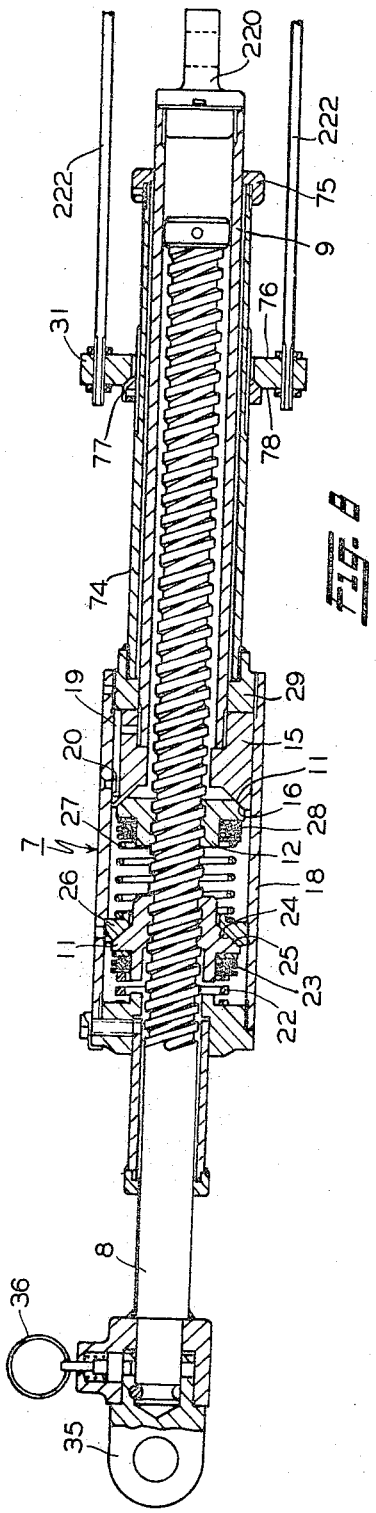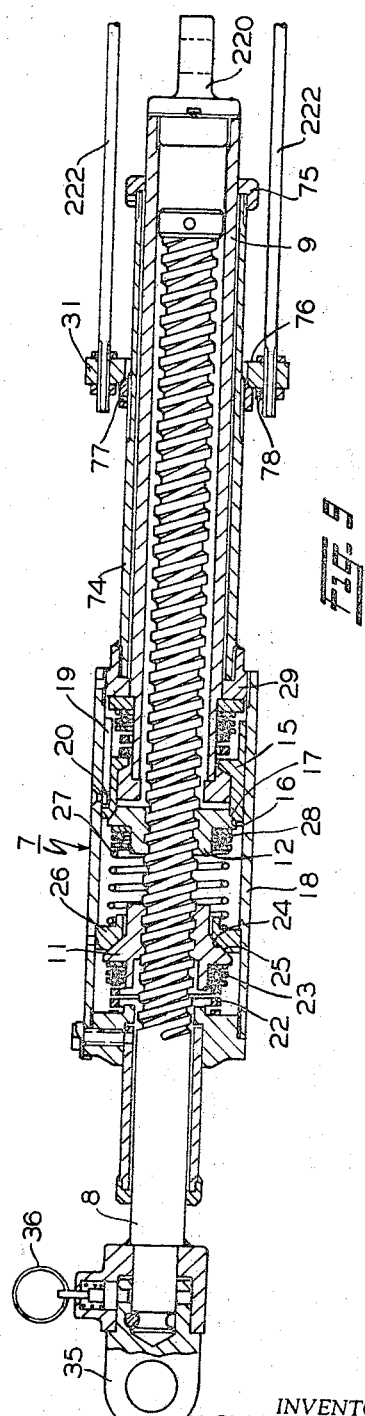

United States Patent Office 3,338,356
Patented Aug. 29, 1967

3,338,356
SLACK ADJUSTER
Woldimar Sobol and Horatio Leslie Higgins, London, England, assignors to Westinghouse Brake & Signal Company, Ltd., London, England
Filed Jan. 21, 1965, Ser. No. 426,807
Claims priority, application Great Britain, Jan. 31, 1964, 4,195/64, 4,196/64, 4,197/64
24 Claims. (Cl. 188—203)

This invention relates to automatic slack adjusters, that is to say, slack adjusters which, in operation, automatically effect slack adjustment as may be required, upon operation of the brakes with which the slack adjusters are connected. The invention is equally applicable to so-called "single-acting" slack adjusters (i.e., adjusters capable of making slack adjustment only in a direction to reduce slack) and to so-called "double-acting" slack adjusters (i.e., adjusters capable of making slack adjustment both in a direction to reduce slack and in the opposite direction to increase slack). Such slack adjusters are of two broad types, those which are incorporated with (and may even be built into) an associated brake cylinder, and those which are incorporated into the brake rigging. The present invention is applicable to either of these two types.

The present invention provides an automatic slack adjuster comprising first and second members movable telescopically relative one to the other to effect slack adjustment, the first member having a threaded portion threadedly engaged by first and second nuts displacement of which on the screw-threaded portion effects relative telescoping of the two members, a sensing member resiliently axially located with respect to the second member and non-rotatably mounted relative thereto for movement with the second member into engagement with a stop, a first spring resiliently holding the first nut clutched relative to the sensing member, and a second spring extending between the sensing member and the second nut and resiliently holding the second nut clutched to the second member, the arrangement being such that a force applied to the first member in the brake-applying direction tends to break the clutches against the resilient force exerted thereon by the springs and a force applied to the first member in the opposite direction tends to reinforce the clutching of the nuts to the sensing member and second member, respectively. By the term "brake-applying direction" it is to be understood that such direction is that direction in which, when the slack adjuster is incorporated in a brake system, in operation of that system, the first member moves during the application of the brakes.

The above construction provides for adjustment for slack by the adjuster in a slack reducing direction only. Consequently, in a double-acting slack adjuster, further means must be provided to secure adjustment of slack in the slack increasing direction. Conveniently, these further means may comprise an element normally held clutched to the second member by a third spring compressible only upon the application thereto of a force, the magnitude and direction of that which is transmitted, in operation of the slack adjuster, through the slack adjuster during actual braking (that is to say, when braking force is actually being applied), said element constituting the means by which the second nut is clutched to the second member and being rotatably supported relative to the second member when the element is de-clutched from the second member by compression of the third spring. By such an arrangement, compression of the third spring before the sensing member engages the stop permits axial displacement by spinning of the two nuts on the first member relatively to adjust the axial relationship of the members by axial movement of one of the members only for as long as the sensing member does not engage the stop. Preferably, the sensing member is non-rotatably coupled to the element conveniently by a pin-and-slot arrangement. Hence, it will be seen that normally (and in the release condition of the slack adjuster) the sensing member will be non-rotatably mounted relatively to the second member being released for rotation relative thereto only upon compression of the third spring and consequent de-clutching of the element from the second member. The rotatable support of the element may be provided by a thrust bearing which may be located either between the third spring and the element or between the third spring and the second member.

The sensing member may be axially located on the second member by being held into engagement with an abutment (which may be annular) located relative to the second member by a second spring.

When the slack adjuster is incorporated with a brake cylinder, the first and second members constitute the piston rod of the brake cylinder, the second member being connected to the piston of the brake cylinder. The stop in this arrangement may conveniently be carried by the cylinder of the brake cylinder.

The present invention may be applied in respect of slack adjusters incorporated with brake cylinders, whether the brake cylinders be of the type for rigidly securing to its mounting or whether it be of the type for being trunnioned to its mounting.

For slack adjusters incorporated with brake cylinders of the former type, the second member is pivotally connected to the piston of the brake cylinder. In slack adjusters for incorporation with brake cylinders of the latter type, the second member may be rigidly secured to the piston of the brake cylinder.

In slack adjusters in which the second member is pivotally secured to the piston of the brake cylinder, the piston may be provided with a hollow trunk surrounding the second member, the trunk being slidable within the cylinder of the brake cylinder and provided at its outer end remote from the piston with means for connection thereto of a hand brake. In this arrangement, the step may comprise a ring secured to the cylinder of the brake cylinder through the trunk. In this case, one side of the ring may constitute the step which is engageable with an annular member carried by the sensing member and the other side of which constitutes an abutment engageable by a stop-ring engagement of which with the abutment constitutes the piston step for the piston of the brake cylinder.

In slack adjusters incorporated in brake cylinders having trunnions by which the brake cylinder can be secured to its mounting, the stop of the slack adjuster may be carried by one end of a tubular extension the other end of which is secured to the cylinder of the brake cylinder and within which the sensing member is axially movable. With such an arrangement where the second member is rigidly secured to the piston of the brake cylinder, the sensing member may be non-rotatably mounted on the second member by being restrained from rotation by a pin-and-slot arrangement between the sensing member and the tubular extension. To facilitate manual resetting of the slack adjuster, the pin of the pin-and-slot arrangement may be withdrawable from the slot being normally held in the slot by resilient means.

For facilitating manual resetting of any of the slack adjusters of the present invention a handwheel may be secured to the first member, there being provided between a crosshead connected to the first member releasable means for preventing relative rotation of the crosshead and the first member. Conveniently between the flywheel and the crosshead there is provided a compression spring and a thrust bearing normally holding the crosshead out of engagement with the flywheel.

These and other objects of the invention will become more readily apparent in the following description, taken in conjunction with the drawings, in which:

FIG. 8 is a cross-sectional view of a fifth embodiment of a single-acting slack adjuster; and FIG. 9 is a cross-sectional view of a third embodiment of a double-acting slack adjuster.

FIGURE 1 shows a cross-sectional view of the simplest of the following embodiments of the invention and illustrates a single-acting slack adjuster incorporated in a brake cylinder of the type provided with trunnions by which the brake cylinder can be secured to its mounting.

Figure 1:
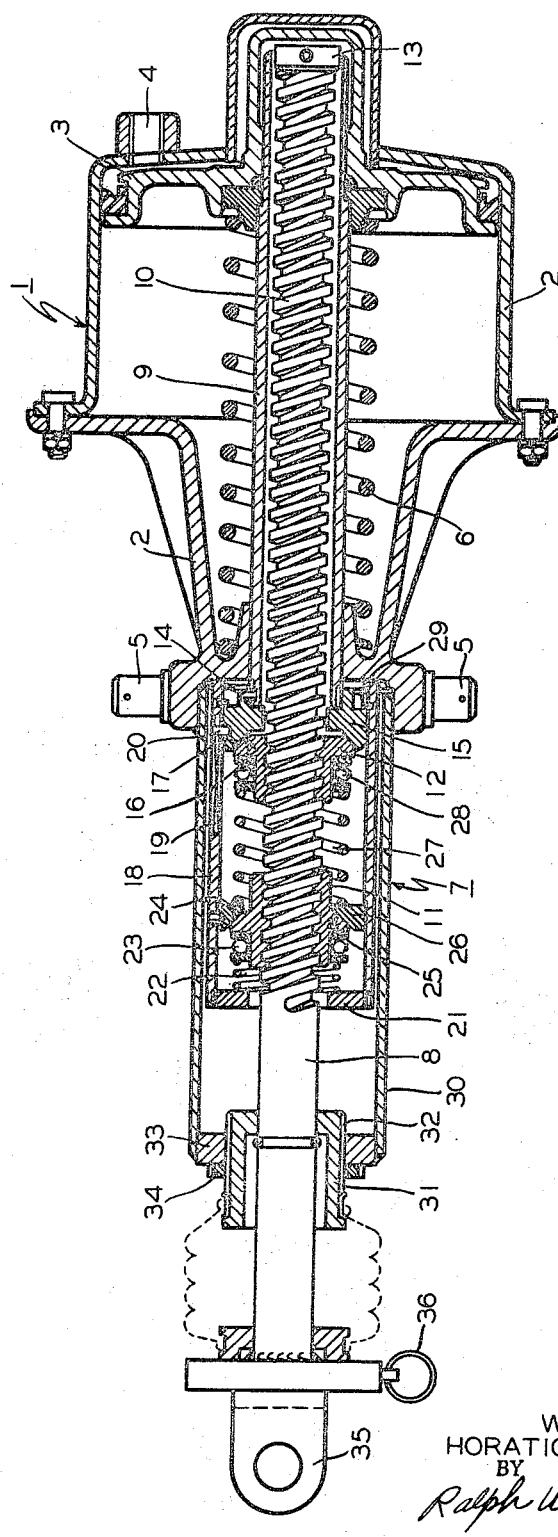
FIG. 1 is a cross-sectional view of one embodiment of a single-acting slack adjuster.

As can be seen from FIGURE 1, there is provided a brake cylinder 1 comprising a cylinder 2 within which is axially slidable a piston 3. The cylinder 2 is provided, in the usual manner, with an inlet 4 and a pair of trunnions 5 by which the brake cylinder can be secured to its mounting to permit the brake cylinder to pivot on its mounting during the application of the brakes (not shown). Again, in the usual manner, the cylinder 2 houses a return spring 6 for the piston 3.

Incorporated with the brake cylinder 1 is the slack adjuster 7. This slack adjuster comprises a first member 8 and a second member 9 movable telescopically relative one to the other. The first member 8 (which is constituted by a spindle) has a threaded portion 10 threadedly engaged with which are first and second nuts 11 and 12, respectively.

The second member 9 (constituted by a tube into which the threaded portion 10 of the spindle 8 projects and is guided by a bearing 13) is rigidly secured by one end to the piston 3. Secured to the opposite end of the tube 9 by being screwed thereon and locked thereto by lock screw 14 is a flange element 15 which provides a clutch face 16 engaged by a clutch face 17 on the nut 12.

Surrounding the two nuts 11 and 12 is a tubular sensing member 18. The sensing member 18 is provided with a linear slot 19 in which is slidable a pin 20 projecting radially outwardly from the flange 15. The sensing member 18 is provided at its lefthand end with an annular end plate 21 abutted by one end of a spring 22 the other end of which abuts a thrust bearing 23 interposed between the spring 22 and the nut 11, so that the spring 22 resiliently urges into engagement a clutch face 24 on the nut 11 and a clutch face 25 on an annulus 26 secured to the sensing member 18. The side of the annulus 26 remote from the clutch face 24 is abutted by one end of a spring 27 the other end of which abuts a thrust bearing 28 interposed between the spring 27 and the nut 12. This spring 27 is effective resiliently to hold the clutch faces 16 and 17 engaged and to urge the sensing member 18 to the left into a position in which a snap ring 29 towards the right-hand end of the sensing member 18 abuts the flange 15 secured to the tube 9. It will be seen, therefore, that the spring 27 is effective resiliently axially to locate the sensing member 18 on the second member (tube 9) and, further, it will be seen that the sensing member 18 is non-rotatably mounted on the tube 9 by virtue of the pin-and-slot arrangement 19–20.

The cylinder 2 of the brake cylinder 1 is provided with a tubular extension 30 which is secured by its right-hand end to the cylinder 2 and carries, on its left-hand end, a stop 31. This stop 31 is provided on its external surface with a screw thread 32 which mates with a cooperating screw thread on an end plate 33 closing the end of the tubular extension 3. The stop 31 is therefore axially adjustable with relation to the tubular extension 30 and can be locked in any desired position by a lock nut 34.

At its outward extremity, the spindle 8 is provided with a crosshead 35. This crosshead 35 is releasably non-rotatably coupled to the spindle 8 by a latch (not shown) which is releasable by a pull-ring 36, to permit relative rotation of the crosshead 35 and the spindle 8.

The above-described brake cylinder and slack adjuster (which has been shown and described in its normal condition, i.e., its condition in the release position of the brakes) operates in the following manner:

Let it be firstly assumed that the clearance between the brake blocks and the wheel is normal. Upon the application of air pressure to the piston 3 through the inlet 4, the piston 3 will be moved to the left against its return spring 6. In so moving to the left, it will carry with it the tube 9 which is fixed to the piston 3 and movement of the tube 9 will be transmitted to the spindle 8 through the flange 15, the clutch faces 16–17 (which prevent the nut 12 from spinning), and the nut 12. During this movement, the sensing member 18 will be carried along with the tube 9 and the spindle 8 by virtue of the spring 27 acting through the annulus 26 onto the sensing member 18 to hold its snap ring 29 in engagement with the flange 15. Insofar as the sensing member 18 is caused to move to the left, the nut 11 and spring 22 will, of course, also be moved to the left. Now, as the initial distance between the stop 31 and the end plate 21 of the sensing member 18 corresponded to the normal clearance of the brake blocks and wheel, such movement of the various parts, as above described, will continue until the brake blocks engage the wheel. However, upon such engagement, the end plate 21 will also engage the stop 31. At this point, the piston 3 will have completed its normal travel required to engage the brake blocks with the wheel and full braking effort can now be applied to the brake blocks by increase of air pressure within the cylinder 2. Such increase of pressure transmits the full braking effort onto the brake blocks via the tube 9, the flange 15, the clutch faces 16–17, the nut 12, the spindle 8, and the crosshead 35.

Upon subsequent release of the brakes by reduction of the air pressure in the cylinder 2, the piston 3 will be returned to the right by its return spring 6. Such movement of the piston 3 is transmitted to the brake blocks through tube 9, flange 15, snap ring 29, sensing member 18, springs 22 and 27, nuts 11 and 12 (which are prevented from rotating by engagement of their respective clutches 23–24 and 16–17), spindle 8 and crosshead 35. Slack return may be, of course, assisted by the weight of the brake blocks, etc. which normally are so hung that their weight acts in a direction to release the brake blocks from engagement with the wheel.

Let it now be assumed that, due to wear of the brake blocks or any other means, the clearance between the brake blocks and the wheels is greater than normal. In this event, the initial stage of operation of the brake cylinder and slack adjuster will be as above described but a stage will be reached at which the end plate 21 of the sensing member 18 will engage the stop 31 whereas, due to the excessive clearance, the brake blocks will not yet have engaged the wheel. Subsequent to this and prior to the brake blocks engaging the wheel, the brake blocks will be continued to be moved by the piston 3 by the movement of the piston 3 being transmitted to the brake blocks through the flange 15, clutch faces 16–17, nut 12, spindle 8, and crosshead 35. Such continued movement of the spindle 8 is permitted because by the movement of the spindle 8 to the nut 11 will tend to be moved with the spindle 8 to the left thus compressing the spring 22. Such compression of the spring 22 releases the clutch faces 24-25 from engagement and the nut 11, being supported on the thrust bearing 23, will be free to spin as the spindle 8 is passed through the nut 11. During this movement subsequent to the engagement of the plate 21 of the sensing member 18 with the stop 31, it will be seen that the nut 12 will be moved closer towards the nut 11 thereby compressing the spring 27.

This movement continues until the brake blocks engage the wheel whereafter further movement is prevented and full braking effort can be applied as above described. The reduction of distance between the two nuts 12 and 11 is therefore a measure of the amount by which the clearance between the brake blocks and the wheel exceeded the normal clearance.

When the clearance was normal, it will be remembered that upon subsequent release of the brakes, the spindle 8 was immediately returned to the right with the return of the piston 3. This return of the spindle 8 was secured because the snap ring 29 was still in engagement with the flange 15. However, in this instance of excessive clearance, not only will the nut 12 have been moved closer to the nut 11 but, by a like distance, the flange 15 will have been separated from the snap ring 29. Consequently, during the initial stage of release, as the tube 9 moves back to the right under the influence of the piston return spring 6, the snap ring 29 is not immediately engaged to return the sensing member 18 with the tube 9. Indeed, any tendency of the sensing member 18 to return to the right is prevented by the previous compression of the spring 27 which now serves resiliently to retain the end plate 21 of the sensing member 18 in engagement with the stop 31. Insofar as the sensing member 18 is, therefore, restrained from movement to the right with the return of the tube 9, the spindle 8 will be likewise restrained as any tendency of the spindle 8 to move to the right only more firmly retains the clutch faces 24-25 engaged and, therefore, more positively prevents the nut 11 from spinning. If, therefore, this nut 11 cannot spin, the spindle 8 cannot move to the right. It will be seen, therefore, that while the tube 9 is returning to the right in this initial stage, the spindle 8, the nut 11, and the sensing member 18 will all be retained in a position corresponding to the abutment of the end plate 21 of the sensing member 18 with the stop 31. However, as the tube 9 returns to the right, it will tend to separate the clutch faces 16-17 between the flange 15 and the nut 12. This easing of the contact between the two clutch faces 16-17 frees the nut 12 for spinning, and the nut 12 will consequently spin (under the influence of the compressed spring 27 and supported on its thrust bearing 28) along the spindle 8 "chasing" the flange 15. Such movement will continue until the flange 15 once more re-engages the snap ring 29 on the sensing member 18. That is, until the spacing between the nuts 11 and 12 is once more restored to normal.

A condition now prevails in which the brake blocks are still in contact with the wheels, the end plate 21 of the sensing member 18 still engages the stop 31, and the relative positions of the nuts 11 and 12 and the sensing member 18 are restored to their normal position. It will be noticed that this condition is characteristic of the position immediately on release when the clearance between the brake blocks and the wheels has been normal. Consequently, further release of the brakes occurs in a manner identical to that of release of the brakes after an application in which the clearance between the brake blocks and the wheels was normal. That is to say, as the piston 3 continues to return to the right under the influence of its return spring 6, all the parts within the sensing member 18 and the spindle 8 will preserve their relative positions and the brake blocks will be removed from contact from the wheels.

By the provision of the latch means (not shown) above mentioned, manual resetting of the clearance in a brake re-blocking operation can be achieved. By pulling on the pull-ring 36, a latch (not shown) is released so that the rod 8 is free to be rotated relative to the crosshead 35. By rotation of the rod 8 (which may be facilitated by the provision of a handwheel secured to the pull-rod 8), the rod 8 can be wound into and out of the tube 9 thus increasing or decreasing, respectively, the brake block clearance. In a re-blocking operation, the rod 8 is rotated sufficient to withdraw the brake blocks from the wheel a distance great enough to allow the worn blocks to be removed and the new blocks to be inserted in their place. With the new blocks in position, it must be ensured (because the slack adjuster is only single-acting) that the clearance is not inadequate. The slack adjuster could not cope with such inadequacy but, if excessive clearance is present then, of course, subsequent operation of the brakes will reset the clearance to normal.

Figure 2:
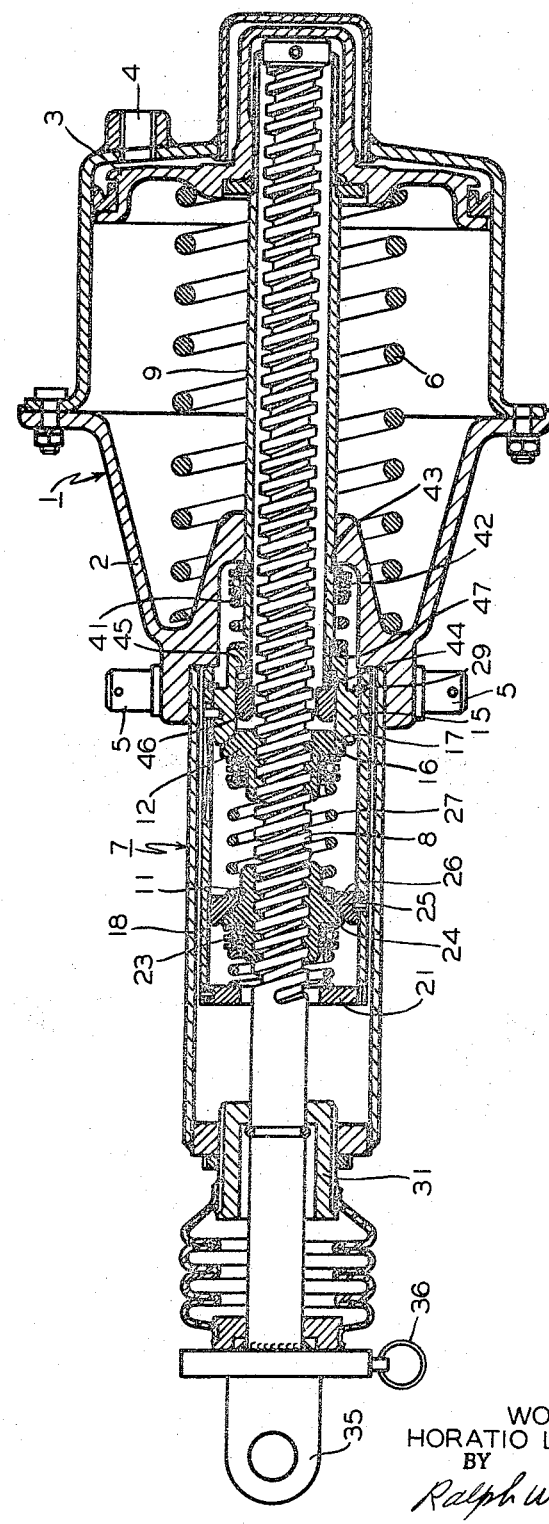
FIG. 2 is a cross-sectional view of one embodiment of a double-acting slack adjuster.

In FIGURE 2 of the accompanying drawings, there is shown a slack adjuster combined with a brake cylinder which is similar to that above described but which provides not only for slack adjustment in the slack reducing direction but also slack adjustment in the slack increasing direction.

In the description in this and all the following embodiments, like reference will be used for like parts to those described above with reference to FIGURE 1.

In FIGURE 2, there is again provided the brake cylinder 1 and the slack adjuster 7. Again, the brake cylinder consists of the same essential elements and the slack adjuster 7 likewise incorporates all the essential elements of the slack adjuster shown in FIGURE 1.

However, additionally, there is provided in the slack adjuster 7 the means by which slack adjustment in the slack increasing direction can be secured. This means comprises interposing between the flange element 15 (which is now slidable on the tube 9) a strong spring 41, one end of which abuts the flange 15 and the other end of which abuts a thrust bearing 42 interposed between the spring 41 and a snap ring 43 secured to the tube 9. The flange 15, in addition to the clutch face 16, is provided with an additional clutch face 44 which mates with a clutch face 45 on an annular end member 46 fixed to the tube 9.

The spring 41 is a very heavy spring which is compressible only by a force of the magnitude of that which is transmitted through the slack adjuster when braking effort is actually being applied. However, axial movement of the flange 15 under even these conditions is limited by the provision on the tube 9 on the shoulder 47.

The operation of the brake cylinder and slack adjuster of FIGURE 2 is as follows:

Let it be assumed firstly that the clearance between the brake blocks and the wheels is normal. Again, as air is introduced into the cylinder 2 through the inlet 4, the piston 3 will be moved to the left carrying with it the tube 9. In the case of the FIGURE 1 construction, this movement of the tube 9 was transmitted direct to the nut 12 through the flange 15 which, it will be remembered, was secured to the tube 9. In the present case, the movement of the tube 9 will be transmitted to the nut 12 through the snap ring 43, the thrust bearing 42, the spring 41 (of which the strength is far in excess of the force now being transmitted and which is required merely to overcome the resistance of the rigging), flange 15, and clutch faces 16–17. Such movement of the nut 12 is again transmitted to the spindle 8 due to the clutching of the nut 12 (and its consequent prevention from spinning) to the flange 15 which, in turn, is prevented from spinning by the interengagement of the clutch faces 44–45.

Such movement to the left of the various parts will continue, as in the construction of FIGURE 1, until the end plate 21 of the sensing member 18 engages the stop 31. Such engagement will occur again as the brake blocks come into engagement with the wheel. After the brake blocks engage the wheel, the spindle 8 will thereby be prevented from further movement to the left as thereby will the nut 12 and the flange 15. However, the tube 9 can still move to the left by a restricted amount as the pressure built up will be sufficient to overcome the resistance of the heavy spring 41 which will be compressed, but, shortly, the tube 9 will be arrested as the shoulder 47 thereon engages the end of the flange 15. After such engagement, full braking effort can now be applied to the brake blocks by the increase of pressure in the cylinder 2 through the piston 3, the tube 9, shoulder 47, flange 15, clutch faces 16–17, nut 12, spindle 8, and crosshead 35.

Upon release of the brakes as the piston 3 is returned to the right by its return spring 6, the spring 41 will recover its pre-loaded condition to re-engage the clutch faces 44–45 and, thereafter, the snap ring 29 having, as in the construction of FIGURE 1, being maintained engaged with the flange 15, the sensing member 18 will be returned to the right with the tube 9. Likewise, as in the construction of FIGURE 1, the return of the sensing member 18 to the right will return with it the spindle 8, thus retracting the brake blocks from the wheel.

Let it now be assumed that the clearance between the blocks and the wheels is in excess of the normal clearance. In the initial stage of the brake application, the various parts will be moved to the left as air is introduced into the cylinder 1, in the manner above described for normal clearance. However, as in the like situation described above with reference to FIGURE 1, the condition will arise in which the end plate 21 of the sensing member 18 abuts the stop 31 whereas the brake blocks have not yet reached the wheel. Thereafter, until the blocks engage the wheels, the blocks will be continued to be moved towards the wheel by the movement of piston 3 being transmitted to the blocks through the tube 9, the snap ring 43, the thrust bearing 42, the spring 41, the flange 15, clutch faces 16–17, nut 12, spindle 8, and crosshead 35. During this latter stage in the application of the brakes, the nut 11 will again be caused to spin by the easing of the clutch faces 24–25 with the result that the nut 12 will again be moved closer to the nut 11 and the flange 15 will be separated from the snap ring 29. Such relative movement will continue until the blocks engage the wheel whereafter the spindle 8 will be prevented from further movement and the spring 41 will be compressed by the continued movement of the tube 9 until the shoulder 47 abuts the flange 15. As in normal clearance, thereafter full braking effort can be applied to the blocks through the tube 9, the shoulder 47, the flange 15, the nut 12 and the spindle 8.

Again, on subsequent release, as in the corresponding release operation in the embodiment of FIGURE 1, after the recovery of the spring 41 to re-engage the clutch faces 44–45, the flange 15 will be returned to the right with the tube 9 upon return of the piston 3 under the influence of the return spring 6 while the spindle 8 is retained stationary with the blocks engaging the wheel, due to the compressed spring 27 maintaining the end plate 21 of the sensing member 18 in engagement with the stop 31. Likewise, as the flange 15 is returned to the right, the nut 12 will be caused by the compressed spring 27 to "chase" the flange 15, until the spacing between the nuts 11 and 12 is restored to normal and the flange 15 once more engages the snap ring 29. This situation is then again characteristic of normal clearance and the brake blocks will be withdrawn from the wheels by the continued return of the piston 3 pulling the sensing member 18 to the right and the spindle 8 through the abutment 26, spring 27, and nut 12 which is prevented by rotation by the re-engagement of the clutch faces 16–17.

Let it now be assumed that the clearance between the blocks and the wheel is now inadequate, that is to say that the clearance between the blocks and the wheel is less than normal. In this event, the initial stage of the application of the brakes is as for normal clearance, but a condition will be arrived at at which the blocks have engaged the wheel but the end plate 21 of the sensing member 18 has not yet reached the stop 31. Continued increase of pressure in the cylinder 2 will increase the force being exerted on spring 41 through the tube 9, the snap ring 43 and the thrust bearing 42. As the pressure continues to increase, the stage will be reached at which the spring 41 will be collapsed, thus freeing the clutch faces 44–45. When this occurs, the sensing member 18, together with the two nuts 11 and 12, are freed for rotation, these parts then being supported on the thrust bearing 42. As the spindle 8 cannot move due to the engagement of the blocks with the wheel, the sensing member 18 and the two nuts 11 and 12 can only spin if they are free to move to the left under the influence of the compressed spring 41. In normal clearance, this they are not free to do, but, in this instance, as the plate 21 is not yet engaged, the stop 31, the sensing member 18 and the nuts 11 and 12 are, in fact, free to spin to the left down the spindle 8. Such spinning will, therefore, occur as the flange 15 "chases" the end member 46 on the tube 9 to the left. Consequently, the tube 9 will telescope over the spindle 8 until the sensing member 18 is prevented from further movement to the left by the engagement of the end plate 21 of the sensing member 18 with the stop 31. When such engagement occurs, the sensing member 18 being prevented from any further movement to the left continued movement of the tube 9 will cause the shoulder 47 to catch up with the flange 15 and to bring it into engagement therewith. This condition is then characteristic of normal clearance immediately before the buildup of braking force. Consequently, the further operations of the slack adjuster are identical to the operation of the slack adjuster in the event of correct clearance between the brake blocks and the wheel.

Again, as in the construction of FIGURE 1, means for manually resetting of the slack adjuster in re-blocking of the brakes is provided, namely, the latch controlled by the pull-ring 36, the operation of which frees the rod 8 for rotation relative to the crosshead 35 and permits the rod 8 to be manually rotated (by means of a hand wheel when provided) to adjust the clearance between the brake blocks and the wheel. However, such facility may not be necessary in a construction involving a double-acting slack adjuster as, for re-blocking the insertion of a wedge between the blocks and the wheel and the subsequent application and release of the brakes, will open up the clearance between the blocks and the wheel (the slack adjuster, due to the presence of the wedge, operating as if inadequate clearance existed). If the gap between the blocks and the wheels is still not sufficient to accommodate new blocks, this operation can be repeated until the gap is sufficient. After re-blocking, no matter what the state of the clearance may be, it will be reset upon a subsequent application and release of the brakes due to the slack adjuster being double-acting.

Figure 3:
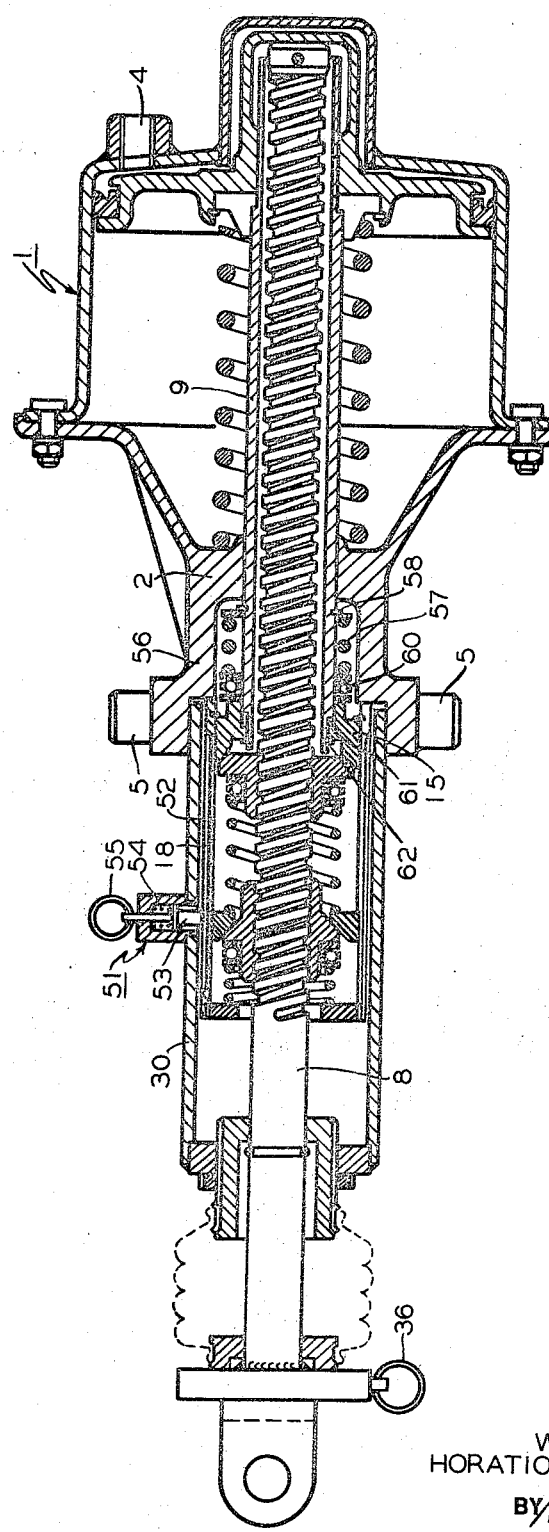
FIG. 3 is a cross-sectional view of another embodiment of a single-acting slack adjuster.

In the slack adjuster of FIGURE 1, as there is no facility for adjusting the slack in an increasing direction, this, as observed above, requires that in a re-blocking operation, it must be ensured that the gap between the blocks and the wheel, after the insertion of new blocks, is not less than normal, as the slack adjuster is not designed to adjust clearance in the slack increasing direction. To render this unnecessary, the slack adjuster of FIGURE 3 is provided with manually controlled means for permitting the slack adjuster to make an adjustment in the slack increasing direction. This means comprises a pin-and-slot arrangement 51 of which the slot 52 is provided in the sensing member 18 and the pin 53 is retractable against a spring 54 urging the pin 53 into the slot 52 by a pull-ring 55. In this arrangement, the pin 20 and slot 19 of the FIGURE 1 construction has been removed but it will be seen that the sensing member 18 is still non-rotatable relative to the tube 9 by virtue of the fact that the tube 9 is non-rotatable relative to the cylinder 2 and the sensing member 18 also being non-rotatable to the cylinder 2, the two parts, tube 9 and sensing member 18, must, therefore, also be relatively non-rotatable.

Further, there is provided mechanism 56 which is similar to the means provided in FIGURE 2 by which the slack adjuster is rendered double-acting, which comprises a spring 57 engaging at one end a snap ring 58 on the tube 9 and at the other end a thrust bearing 60 abutting the flange 15 which, but for the spring 57, would be slidable on the tube 9. Again, in any case, the travel of the flange 15 is limited by a shoulder 61 on the tube 9 and by a snap ring 62 into engagement with which the flange 15 is urged by the spring 57.

In re-blocking, to open the gap between the blocks and the wheels, a wedge is inserted between the blocks and the wheel and the pull-ring 55 pulled to withdraw the pin 53 from the slot 52. Upon the brake then being applied, the slack adjuster will detect inadequate clearance (in fact, no clearance) and will act in the manner of the double-acting slack adjuster of FIGURE 2 to make a gap between the wedge and the blocks. By this means, the gap between the blocks and the wheel will, therefore, be increased. If the gap is still not sufficient for the insertion of the new blocks, repeated application and release of the brakes can be made while the pin 53 is held retracted from the slot 52 and with the wedge being pushed further between the blocks and the wheel for each application of the brakes, until a sufficient gap between the blocks and the wheel has been established to permit the insertion of new blocks.

Again, after the insertion of new blocks, no matter what may be the clearance between the blocks and the wheels, this will be automatically corrected to the normal clearance by an application of the brakes with the pin 53 held retracted from the slot 52. When normal clearance has been restored between the new blocks and the wheel, the pull-ring 55 is released to allow the pin 53 to re-enter the slot 52 whereby rendering the slack adjuster once again merely a single-acting slack adjuster.

In all the arrangements above described, the brake cylinder is provided with trunnions 5 by means of which the cylinder is pivotally secured on its mounting. However, such a construction is open to certain objections and, in some instances, it is preferable that the cylinder should be rigidly secured to its mounting, although this does produce complications, as it is necessary for the free end of the piston rod to be free to move up and down relative to the mounting to accommodate rise and fall of the crosshead during the application and release of the brakes and to move sideways to accommodate rigging float and wear.

There will now be described, with reference to FIGURES 4-6, embodiments of the present invention employing a fixed cylinder. These figures show sectional views of the slack adjusters, with the section above the center line being at right angles to the section below that line.

Figure 4:
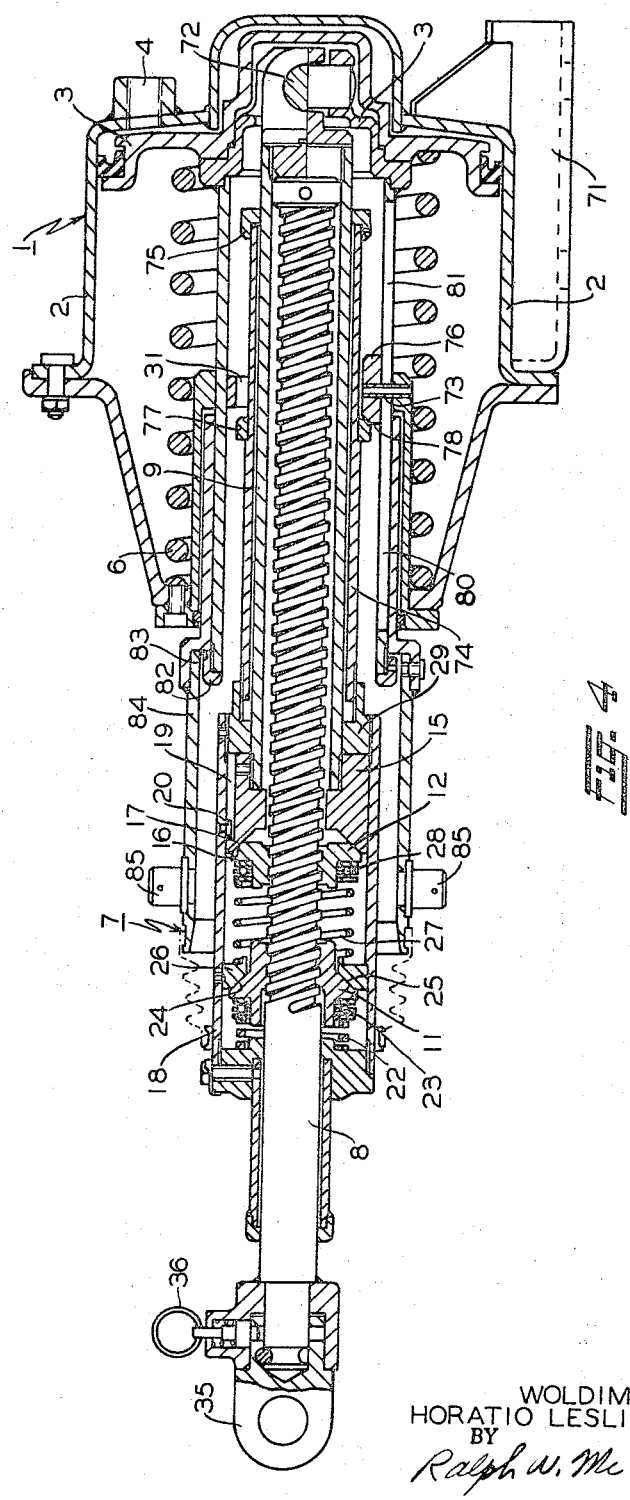
FIG. 4 is a cross-sectional view of a third embodiment of a single-acting slack adjuster.

Referring now to FIGURE 4, there is here illustrated a brake cylinder 1 with which is incorporated a slack adjuster 7. The brake cylinder 1 comprises a cylinder 2 provided with a bracket 71 by which it may be rigidly secured to its mounting. As in the previous embodiments, the cylinder 2 is provided with a piston 3, an inlet 4, and a piston return spring 6.

The slack adjuster 7 again comprises a spindle 8 and a tube 9, but in this case the tube 9 is pivotally connected by a pin 72 to the piston 3. There is also the sensing member 18, the nuts 11 and 12 together with their associated springs and thrust bearings 22, 27, 23 and 28, respectively, the nut 11 again has a clutch face 25 engageable with a clutch face 24 on the annulus 26 secured to the sensing member 18, and the nut 12 has a clutch face 17 engaged with the corresponding face 16 on the flange 15 secured to the end of the tube 9.

Likewise, there is provided a stop 31 which, in this case, is secured to a part of the cylinder 2 by means of a plurality of pins 73 (of which one only is shown).

In this case, the sensing member 18 is provided with a tubular extension 74 extending rearwardly of the sensing member 18 towards the piston 3. The extension 74 is provided towards its right-hand end with a stop-ring 75 engageable with a stop face 76 on the ring 31. Also, on the other side of the ring 31 there is secured to the extension 74 a further ring 77 engageable with an an abutment face 78 on the side of the ring 31 opposite to that of the stop face 76. The automatic operation of this single-acting slack adjuster is essentially similar to the operation of the slack adjuster of the slack adjuster of FIGURE 1, that is to say, as follows:

Let it first be assumed that the clearance is normal. Upon the introduction of air into the cylinder 2 through the inlet 4, the piston 3 will be caused to move to the left against its return spring 6, taking with it the tube 9. Again, movement of the tube 9 to the left carries the spindle 8 to the left through the medium of the flange 15, clutch faces 16-17, and nut 12. As the brake clearance is normal, the blocks will engage the wheels at the instance that the ring 75 engages the stop face 76 of the ring 31. Full braking effort is now transmitted to the brake blocks as the pressure in the cylinder 2 increases, through piston 3, pivot pin 72, tube 9, flange 15, clutch faces 16-17, nut 12, spindle 8, and crosshead 35.

Release of the brakes will also be similar in that the ring 29 (corresponding to the snap ring 29 of the previously described embodiments) still being abutted by the flange 15 under the influence of the springs 27, the sensing member 18 will be returned to the right with the tube 9 under the influence of the piston return spring 6. This return movement of the sensing member 18 will be transmitted to the brake blocks through the springs 22 and 27, the nuts 11 and 12 (which are again prevented from rotation by the engagement of the clutch faces 24-25 and 16-17, respectively), spindle 8, and crosshead 35.

At the end of the return stroke of the piston 3, it will be noted that in this arrangement the final position of the piston 3 is determined by abutment of the rings 77 on the tube 9 with the abutment face 78 on the ring 31.

Let it now be assumed that the clearance between the blocks and the wheels is excessive. In this case, the initial stage of the application of the brakes will be as above described, but a condition will be reached at which, while the ring 75 is abutting the stop face 76, the blocks will not yet be in engagement with the wheel. Continued movement of the piston 3, therefore, continues the movement of the tube 9 which, through the nut 12, will continue the movement of the spindle 8 until the blocks engage the wheel. During this continued movement, the nut 11 will be caused to spin as the spindle 8 is moved in the brake-applying direction through the nut 11 to compress the spring 22 and ease the engagement of the clutch faces 24-25 to allow the nut 11 to spin. Again, such operation will cause the nut 12 to be moved closer to the nut 11 and for the flange 15 to be moved away from the snap ring 29, the amount of each of these movements being a measure of the amount of excess of clearance which existed before the application between the blocks and the wheel.

On release of the brakes during the initial stage of this release, the spindle 8 will be retained in a position in which the blocks are maintained engaged with the wheel by virtue of the compressed spring 27 maintaining the sensing member 18 in position with its ring 75 abutting the stop face 76, while the tube 9 is returned to the right under the influence of the piston return spring 6, and the nut 12 is caused to "chase" the flange 15 under the influence of the spring 27. This recovery continues until the flange 15 once more abuts the snap ring 29, a condition characteristic of normal clearance of the brakes. Thereafter, continued return of the piston 3 will, through the tube 9, the sensing member 18, the spring 27 and the nut 12, return the slack adjuster 7 bodily to the right and, through the movement of the spindle 8, pull the blocks away from the wheel. Such return will, again, continue until the ring 77 engages the abutment face 78 on the ring 31.

In the embodiment as shown in FIGURE 4, there is also provided latch means for manual resetting of the slack adjuster similar to that described with reference to the previous figures by which the crosshead 35 can be rotatably disconnected from the spindle 8 to permit the spindle 8 to be screwed in and out of the tube 9.

To provide for the hand brake operation of the embodiment of FIGURE 4, there is provided, secured to the piston 3, a trunk 80 which surrounds the tube 9 and is provided with a slot 81 for each of the pins 73 securing the ring 31 to the cylinder 2. The trunk 80 is provided at its outward end remote from the piston 3 with an end stop 82 engageable with a shoulder 83 on a tubular member 84 provided with trunnions 85 to which the hand brake can be connected. It will be seen that by pulling trunnions 85 to the left, the shoulder 83 will be engaged with the end ring 82 to pull the piston 3 also to the left to cause operation identical to that as if air had been applied to the cylinder 2. Likewise, if the pull to the left on the trunnions 85 is released, the piston 3 will be returned to the right by the piston return spring 6 in exactly the same manner as in the normal air operation of the brake cylinder 1.

Figure 5:
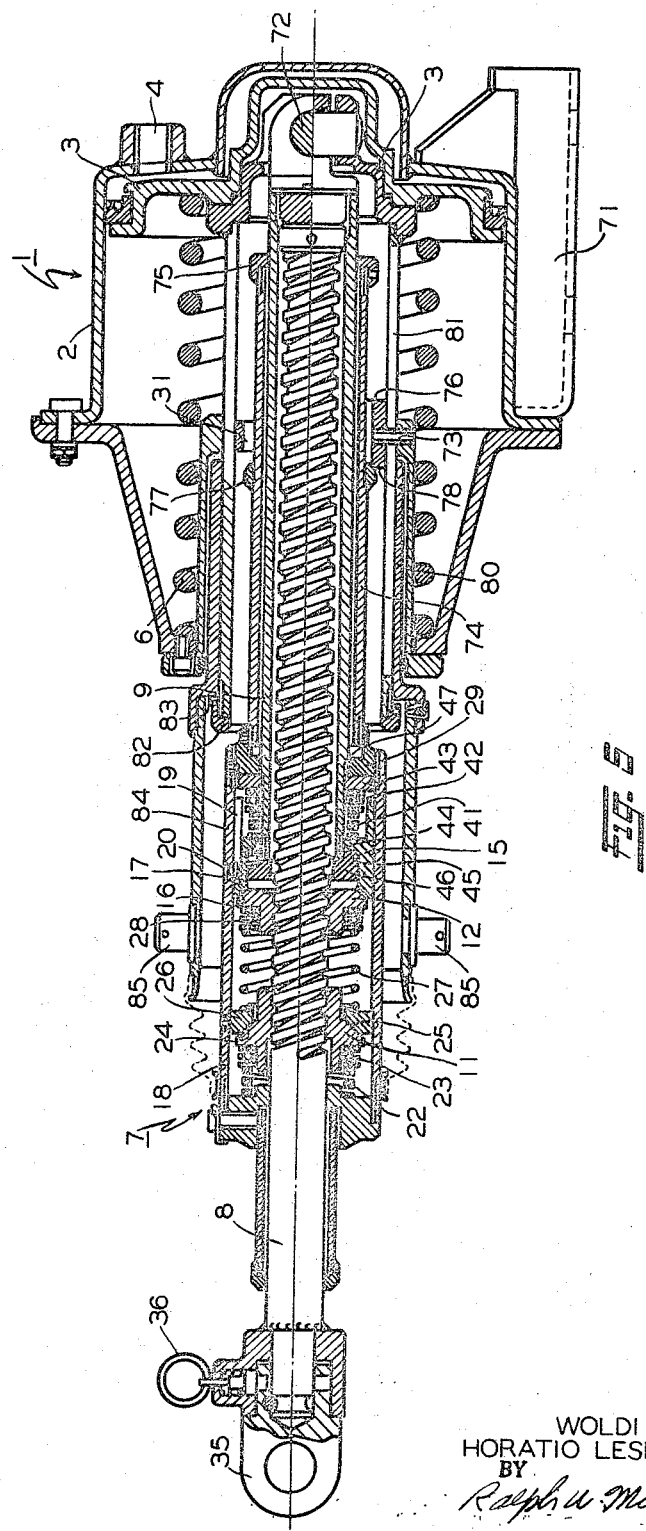
FIG. 5 is a cross-sectional view of another embodiment of a double-acting slack adjuster.

In FIGURE 5, there is shown an embodiment similar to that of FIGURE 4 but modified to provide for double action of the slack adjuster.

In order to provide the slack adjuster with the facility for adjusting in respect of inadequate clearance, the slack adjuster is provided with means similar to that provided in the slack adjuster of FIGURE 2. The flange 15 is again axially movable with respect to the tube 9 but is normally maintained axially located thereon by the heavy spring 41 which urges into engagement the clutch faces 44–45 on the flange 15 and on an end ring 46 secured to the tube 9, respectively. There is again provided a member 43 corresponding to the snap ring 43 of the embodiment of FIGURE 2, between which and the heavy spring 41 there is located a thrust bearing 42. There is a minor difference between the construction of the present FIGURE 5 and that of FIGURE 2, in that the shoulder 47 with which the flange 15 is engageable is not carried direct by the tube 9 but is carried by the member 43 secured thereto.

The operation of this construction of FIGURE 5 differs from that of FIGURE 4 in the cases of normal and excessive clearance only, in that, in each occasion, after the blocks have engaged the wheel and build-up of pressure within the cylinder 2 commences to apply the braking force, the spring 41 is collapsed by the force transmitted through the slack adjuster to cause engagement of the flange 15 with the shoulder 47. Hence, when braking force is being applied, this force is transmitted through the tube 9, the shoulder 47, the flange 15, nuts 12, spindle 8, and crosshead 35.

In the event of inadequate clearance, the operation is as follows:

During the initial stage of a brake application, as before, the blocks are moved towards the wheel upon the application of air pressure into the cylinder 2 by movement of the piston 3. This movement of the piston 3 is transmitted through the pin 72, the tube 9, the member 43, the thrust bearing 42, spring 41, flange 15 (which is prevented from rotation by the inter-engagement of the clutch faces 44–45), nut 12 (which is prevented from rotation by inter-engagement of the clutch faces 16–17), spindle 8, and crosshead 35. However, by virtue of the inadequate clearance, the blocks will engage the wheel before the ring 75 engages the stop face 76. Such engagement of the blocks with the wheel arrests the spindle 8 and prevents further movement of it to the left. When the spindle 8 stops, the nut 12 also tends to stop so that the force transmitted through the slack adjuster causes compression of the spring 41. This compression of the spring eases the clutch faces 44–45 out of engagement so that the whole of the slack adjuster is now supported on the thrust bearing 42 and (as in the arrangement of FIGURE 2) the slack adjuster spins to the left down the spindle 8 chasing the end ring 46 on the tube 9. Such movement continues until the ring 75 engages the stop face 76 whereupon further spinning movement of the slack adjuster is prevented and the shoulder 47 is caused by further movement of the tube 9 to catch up with the flange 15 and to permit the application of full braking effort in the normal manner. Again, this condition is characteristic of normal clearance and subsequent release of the brakes occurs in a manner identical to that as if the clearance had been normal in the first instance.

As can be seen from FIGURE 5, this embodiment is also provided with the means 80–85 whereby the apparatus can be operated by a hand brake.

Again, there is provided latch means for facilitating the manual resetting of the slack adjuster in a re-blocking operation.

Figure 6:
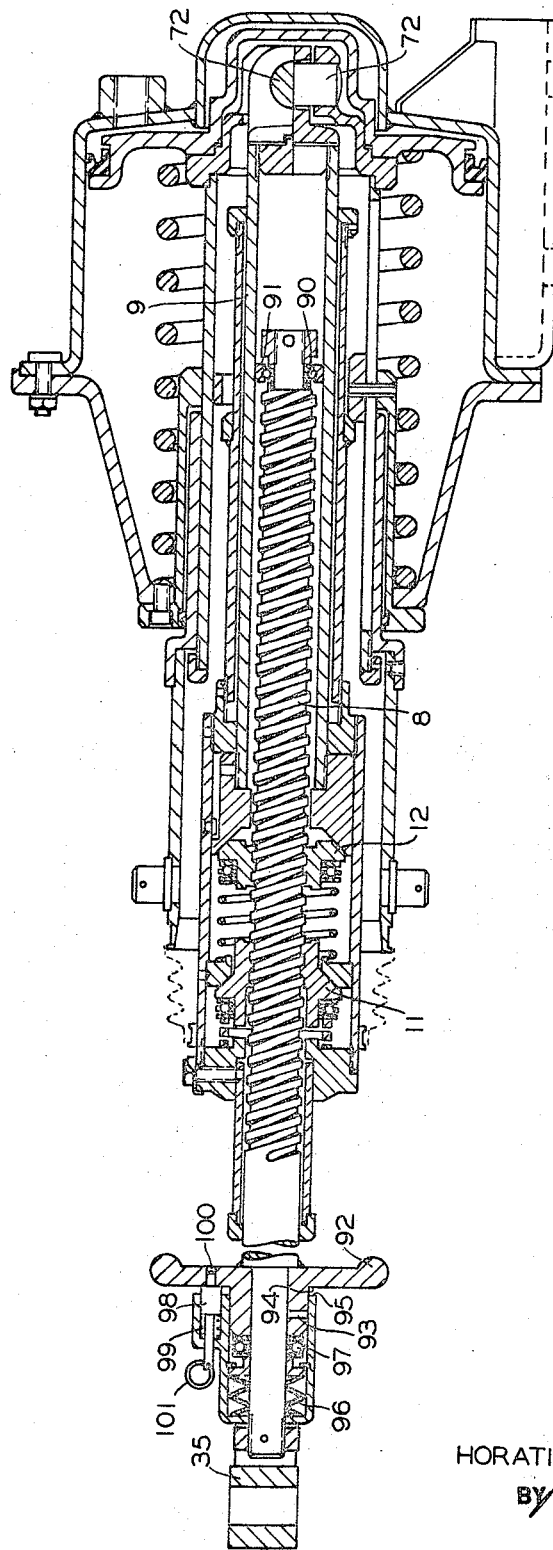
FIG. 6 is a cross-sectional view of a fourth embodiment of a single-acting slack adjuster.

In FIGURE 6 there is illustrated an embodiment substantially identical to that of FIGURE 4, save in that means are provided for facilitating such resetting. Although, in the embodiment of FIGURE 6, these means are incorporated in the single-acting version of the combined brake cylinder and slack adjuster, it would be appreciated that the means can equally be incorporated in the double-acting slack adjuster and brake cylinder of FIGURE 5.

The means comprises providing at the inner end of spindle 8 a rotary bearing 90, the outer face 91 of which constitutes a sliding fit within the tube 9. At the opposite end of the spindle 8 there is secured to it a flywheel 92 which is screwed onto the spindle 8 and is located thereon by a set screw 93. The flywheel 92 is provided with a bearing face 94 engageable with a corresponding bearing face 95 on the crosshead 35. The spindle 8 is normally (in the release postion) urged out of engagement with the crosshead 35 by a spring 96 between which and the flywheel 92 is a thrust bearing 97. The spindle 8 is releasably held in non-rotatable relationship with the crosshead 35 by means of a pin 98 urged by a spring 99 into a slot 100 in the flywheel 92. This pin 98 is withdrawable from the slot 100 by means of a pull-ring 101.

The automatic operation of this arrangement is identical to that of FIGURE 5 and requires, therefore, no further description in this respect.

In the manual resetting of the slack adjuster during the re-blocking operation, by means of the pull-ring 101, the pin 98 is withdrawn from the slot 100. The spindle 8 is now rotatable relative to the crosshead 35, and by spinning the flywheel 92, the spindle 8 is rotated to cause it to spin through the nuts 11 and 12, thus withdrawing the blocks further from the wheel to permit the insertion of new blocks. The spring 96 and thrust bearing 97 are provided to ensure that the faces 94 and 95 are separated and do not present frictional resistance to the spinning of the spindle 8.

The provision of this inter-connection between the spindle 8 and the crosshead 35 does not interfere with the automatic operation of the slack adjuster, as the spring 96 is always compressed during the application of a brake to inter-engage the two faces 94 and 95. Thus, braking effort is applied to the crosshead 35 by the spindle 8 through the flywheel 92 and the faces 94–95 which will be brought into engagement by the application of braking pressure.

In all the embodiments above described, the slack adjuster 7 is incorporated with the brake cylinder 1.

However, the present invention is equally applicable to slack adjusters which are mounted independently of the brake cylinder, and slack adjusters of this type embodying the present invention will now be described.

Figure 7:
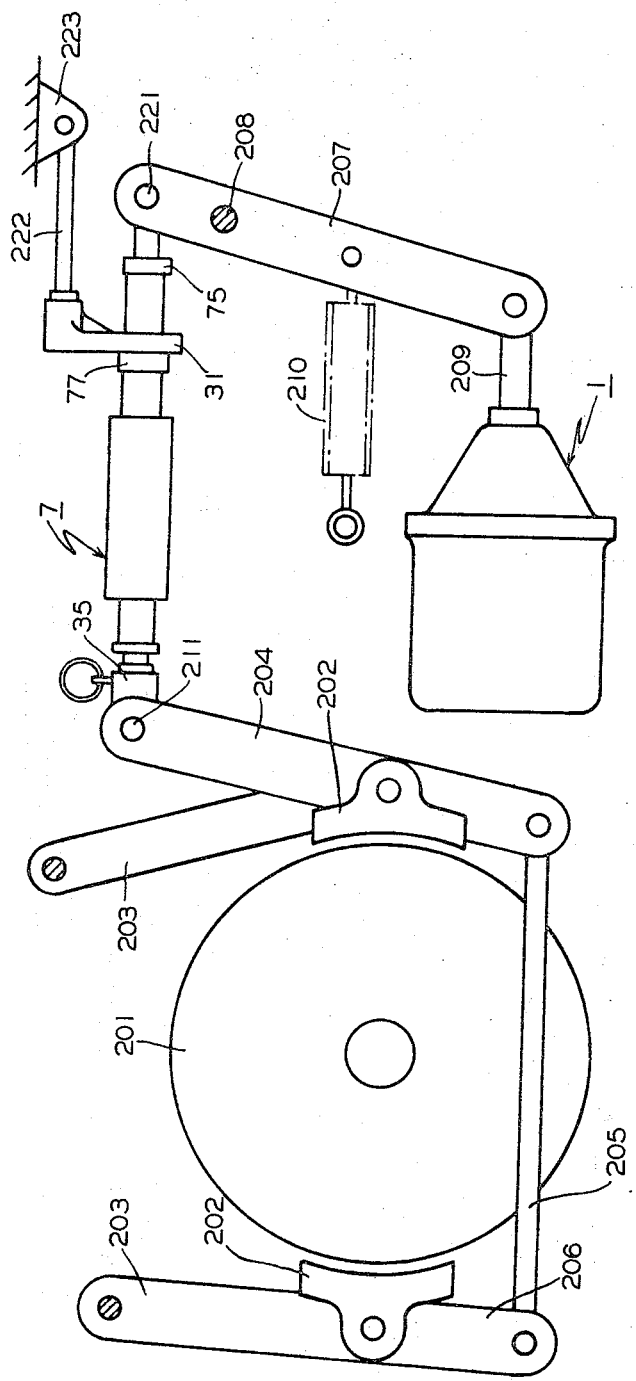
FIG. 7 is a schematic diagram showing a slack adjuster disposed in a typical brake rigging.

In FIGURE 7 there is illustrated a typical brake rigging arrangement in which there is incorporated a slack adjuster constructed in accordance with the present invention.

In FIGURE 7 there is shown a wheel 201 engageable for the purpose of braking the wheel by a pair of diametrically opposed brake blocks 202. The brake blocks 202 are suspended from hangers 203 to which the brake shoes carrying the brake blocks 202 are pivotally connected. To the left-hand brake shoe is also pivotally connected a lever 204, the lower end of which is pivotally connected to one end of a tie rod 205, the other end of which is pivotally connected to an extension 206 of the hanger 203 by which the right-hand brake shoe 202 is suspended.

The upper end of the lever 204 is pivotally connected to one end of the slack adjusters 7, the other end of which is pivotally connected to a second lever 207 pivotally supported about pin 208 and pivotally connected at its other end to the piston rod 209 of a brake cylinder 1.

In accordance with the usual practice, there is provided a rigging return spring 210.

It will be seen from FIGURE 7 that operation of the brake cylinder 1 to move its position rod 209 to the right will cause the brake blocks 202 to be brought into engagement wtih the wheel 201 through the pivotal displacement of the lever 207 about its pivot pin 208, the axial displacement of the slack adjuster 7, and the pivotal movement of the lever 204.

The slack adjuster 7 may be either of the single-acting type or the double-acting type, and one of each of these types is shown in FIGURES 8 and 9.

In FIGURE 8, there is shown a single-acting slack adjuster which constructionally is substantially identical to the slack adjuster of the combined brake cylinder and slack adjuster shown in FIGURE 4. In view of the similarity between the slack adjuster of FIGURE 8 and the slack adjuster 7 in FIGURE 4, it is believed that there is no necessity for a detailed description of this slack adjuster except merely to observe the small differences which arise in the construction of the respective slack adjusters due to their different contexts, and to observe the manner in which the slack adjuster 7 of FIGURE 8 is connected in the brake rigging illustrated in FIGURE 7. The crosshead 35 connected by the latch means (illustrated in cross section in FIGURE 8) to the first member 8 is pivotally connected by pin 211 to the lever 204 (FIGURE 7). At the other end of the slack adjuster 7, the second member 9 is provided with a crosshead 220 (instead of being connected to the piston 3, as in FIGURE 4), and this crosshead 220 is connected by a pin 221 to the lever 207 (FIGURE 7).

In the construction of FIGURE 4, the extension 74 carries the stop-ring 75 and the further ring 77. These rings are engageable in operation of the slack adjuster with the faces 76 and 78, respectively, of the ring 31 which is secured to a part of the cylinder 2 by the pins 73. In the FIGURE 8 construction, the slack adjuster 7 being removed from the brake cylinder 1, the ring 31 is located separately from the brake cylinder 1 and is mounted on a pair of rods 222 pivotally carried by a fixed bracket 223. The operation of the slack adjuster shown in FIGURE 8 is substantially identical to that of the slack adjuster shown in FIGURE 4.

Let it first be assumed that the clearance is normal. Upon the introduction of air into the brake cylinder, its piston rod 209 will be forced to the right, as viewed in FIGURE 7. Such movement of the piston rod 209 causes the lever 207 to pivot about its pin 208 to exert a thrust to the left on the second member 9 through the crosshead 220. Leftward movement of the member 9 will be transmitted to the first member 8 through the flange 15, clutch faces 16–17, and nut 12 which, by virtue of the interengagement of the clutch faces 16–17, will be prevented from rotation. As the brake clearance is normal, the blocks 202 will engage the wheel 201 at the instant that the ring 75 engages the stop face 76 on the ring 31. Full braking effort is now transmitted to the brake blocks as the pressure in the brake cylinder 1 increases, through the piston rod 209, the lever 207, the second member 9, flange 15, clutch faces 16–17, nut 12, first member 8, crosshead 35, and lever 204.

Release of the brakes is achieved by means of the rigging return spring 210 when the air pressure in brake cylinder 1 is reduced. This return spring 210 will cause the lever 207 to be pivoted in the opposite direction so as to exert a pull on the second member 9. Such pull on the second member 9 will be transmitted to the first member 8 through the flange 15, the ring 29, the sensing member 18, the springs 22 and 27, the nuts 11 and 12 (which are again prevented from rotation by the engagement of the clutch faces 24–25 and 16–17, respectively). Such return movement of the second member 8 will, through the crosshead 35, cause pivoting of the lever 204 in the reverse direction so as to release the brake blocks 202 from engagement with the wheel 201.

Let it now be assumed that the clearance between the blocks 202 and the wheel 201 is excessive. In this case, the initial stage of the application of the brakes will be as above described, but a condition will be reached in which, while the ring 75 is abutting the stop face 76, the blocks 202 will not yet be in engagement with the wheel 201. Continued movement of the piston rod 209, therefore, continues the movement of the second member 9 which, through the nut 12, will continue the movement of the first member 8 until the blocks 202 engage the wheel 201. During this continued movement, the nut 11 will be caused to spin as the second member 8 is moved in the brake-applying direction through the nut 11, to compress the spring 22 and ease the engagement of the clutch faces 24–25 to allow the nut 11 to spin. Again, such operation will cause the nut 12 to be moved closer to the nut 11 and for the flange 15 to be moved away from the ring 29, the amount of each of these movements being a measure of excess of clearance which existed before the application, between the blocks 202 and the wheel 201.

On release of the blocks, during the initial stage of this release, the second member 8 will be retained in a position in which the blocks 202 are maintained engaged with the wheel 201 by virtue of the compressed spring 27 maintaining the sensing member 18 in a position with its ring 75 abutting the stop face 76, while the tube 9 is returned to the right under the influence of the rigging return spring 210, and the nut 12 is caused to "chase" the flange 15 under the influence of the spring 27. This recovery continues until the flange 15 once more abuts the ring 29, a condition characteristic of normal clearance of the brakes. Thereafter, continued return of the piston rod 209 under the influence of the rigging return spring 210 will, through the tube 9, the sensing member 18, the spring 27, and the nut 12, return the slack adjuster bodily to the right, pivoting with it the lever 204 to pull the blocks 202 away from the wheel 201. Such return will again continue until the ring 77 engages the abutment face 78 on the ring 31.

As described above with reference to various of the embodiments, manual adjustment of the clearance can be made by operating the latch means by the pull-ring 36 and manually rotating the second member 8 to wind the member in or out as may be required of the second member 9.

In FIGURE 9, there is illustrated a double-acting slack adjuster which is substantially similar in construction to the slack adjuster 7 shown in FIGURE 5, and the construction and operation of which will be clear and apparent by reference to the description of the slack adjuster 7 in FIGURE 5, and by comparison of the differences between these two slack adjusters which are similar to the differences between the slack adjuster 7 of FIGURE 8 in the slack adjuster 7 of FIGURE 4.

All the above-described slack adjusters are of the type designed to be subjected to compressive forces during a brake application, but the present invention is equally applicable to slack adjusters which, in operation, are subject to tensile forces.

Having now described the invention, what we claim as new and desire to secure by Letters Patent, is:

1. An automatic slack adjuster comprising, support means, means carried by said support means for effecting automatic adjustment of slack in the slack decreasing direction, said automatic slack adjusting means comprising a first and second means movable telescopically relative one to the other to effect slack adjustment, said first means having a threaded portion threadedly engaged by first and second nuts, displacement of which nuts on the screw-threaded portion effects relative telescoping of said first and second means, a sensing member disposed on said second means for axial movement relative thereto and biased to a predetermined position relative to said second means in the brake applying direction with respect to said second member and for movement with the second member into engagement with the stop on said support means, means preventing relative rotation between said sensing member and said second means during axial movement of said sensing member relative to said second means, a first spring resiliently holding the first nut in a first clutching engagement relative to the sensing member and a second spring extending between the sensing member and the second nut and resiliently holding the second nut in a second clutching engagement with the second member, the arrangement being such that a force applied to the first member in the brake-applying direction tends to break said first and second clutch engagements against the resilient force exerted thereon by said first and second springs and a force applied to the first member in the opposite direction tends to reinforce each of said first and second clutching engagements.

2. The automatic slack adjuster as recited in claim 1, in which manually operative reset means are provided for effecting adjustment of said first and second nuts axially of said first member to telescope said first member within said second member in the slack increasing direction.

3. The automatic slack adjuster as recited in claim 2, in which said second means comprises an element disposed for axial movement between spaced limits on a member, said sensing member is axially slidable on and biased to said predetermined position with respect to said element, a third spring biases said element in the brake applying direction into engagement with one of said limits, said second nut is engageable with said element and comprises said second clutching engagement, said means preventing relative rotation between said sensing member and said second means comprises a pin on said support normally disposed in an axial slot in said sensing member, and, said pin being removably disposed in said slot to facilitate unitary rotation of said element, said sensing member and said first and second nuts relative to said first means in the slack increasing direction to reset said slack adjuster.

4. The slack adjuster as recited in claim 1, wherein the sensing member is disposed in said predetermined position by engagement of an abutment thereon with an abutment on said second member under the urging of said second spring.

5. The slack adjuster as recited in claim 1, wherein said support means includes a brake cylinder, and wherein the first and second members comprise the piston rod of the brake cylinder, with the second member being connected to the piston of the brake cylinder.

6. The slack adjuster as recited in claim 5, wherein said stop is carried by the brake cylinder.

7. The slack adjuster, as recited in claim 6, wherein the brake cylinder is adapted for rigidly securing to a mounting, and the second member is pivotally connected to the piston of the brake cylinder.

8. The slack adjuster as claimed in claim 7, wherein the piston is provided with a hollow trunk surrounding the second member, the trunk being slidable within the cylinder of the brake cylinder and provided at its outer end remote from the piston with means for connection to a hand brake.

9. The slack adjuster as recited in claim 8, wherein said stop comprises a ring disposed within and secured to the trunk.

10. The slack adjuster as recited in claim 9, wherein one side of the ring comprises said stop which is engageable with an annular member carried by said sensing member, and the other side of the ring comprises said abutment engageable by a stop-ring carried by said sensing member.

11. The slack adjuster as recited in claim 5, wherein the brake cylinder is adapted for being trunnioned to a mounting and said stop is carried by one end of a tubular extension, the other end of which extension is secured to the brake cylinder and within which extension said sensing member is axially movable.

12. The slack adjuster as recited in claim 11, wherein said second member is rigidly secured to the piston of the brake cylinder and wherein said means preventing relative rotation between said sensing member and said second member comprises a pin on one of said members and a slot on the other of said members.

13. The slack adjuster as recited in claim 12, wherein said pin is adapted for manual withdrawal from the slot and is normally held in the slot by resilient means.

14. The slack adjuster as recited in claim 1, wherein a handwheel is secured to the first member and means are provided for releasably connecting said first member to a crosshead.

15. The slack adjuster as recited in claim 14, wherein a compression spring and thrust bearing are disposed between the flywheel and the crosshead normally holding the crosshead out of non-rotatable engagement with the handwheel.

16. The slack adjuster, as recited in claim 1, in which said first member comprises a spindle provided with a screw-threaded portion slidable within the other member, said other member comprising a tubular-shaped member.

17. The slack adjuster as recited in claim 16 in which said first member is tubular-shaped and said screw-threaded portion is disposed on the external surface thereof, said first member being slidable within the second member, said second member being tubular.

18. A slack adjuster comprising support means, first and second members movable telescopically relative one to the other to effect slack adjustment, nut means threadedly engaged with a screw-threaded portion of the first member and axially engageable with said second member to determine the normal telescopic relationship between said first and second members, means operable in response to axial movement of said second member beyond a predetermined point fixed with respect to said support means in the brake applying direction to axially adjust said nut means on said first member to extend said first member relative to said second member a distance corresponding to the distance of overtravel of said other member relative to said point, first means for attaching said first member axially rotatably to brake rigging, second means releasably preventing relative axial rotation between said first means and said first member.

19. The slack adjuster as recited in claim 18, in which said first means comprises a crosshead, a handwheel is secured to said first member, an end face on said handwheel is engageable with a face of said crosshead upon application of a brake force, and resilient means is disposed between said end face and said face to urge said end face and said face out of engagement.

20. The slack adjuster as recited in claim 19, wherein said resilient means comprises a compression spring.

21. The slack adjuster as recited in claim 20, wherein a rotary bearing supports said handwheel, said rotary bearing being disposed between said spring and said handwheel.

22. The slack adjuster as recited in claim 18, wherein said second means comprises a pin on said crosshead normally engaged in a slot in said handwheel, said pin being withdrawable from the slot to release said second means.

23. The slack adjuster as recited in claim 22, wherein said pin is resiliently urged into said slot.

24. The slack adjuster as recited in claim 18, wherein said first member carries a rotary bearing slidable within said first member to facilitate relative rotation thereof when said second means is disengaged.

References Cited

UNITED STATES PATENTS

| | | | |
|---|---|---|---|
| 2,804,179 | 8/1957 | Jeppsson | 188—196 |
| 2,908,360 | 10/1959 | Browall | 188—196 |
| 3,043,406 | 7/1962 | Larsson | 188—196 |

DUANE A. REGER, *Primary Examiner.*